Figure 1:
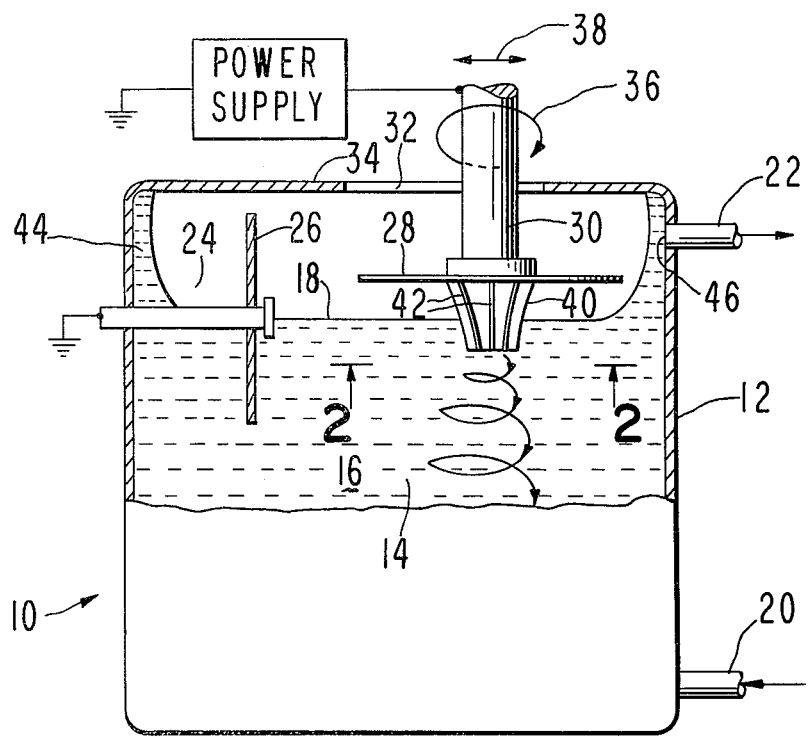

United States Patent [19]

Schlienger

[11] 3,955,062
[45] May 4, 1976

[54] ARC SAW COOLING AND DUST COLLECTION SYSTEM
[75] Inventor: Max P. Schlienger, San Rafael, Calif.
[73] Assignee: Schlienger, Inc., San Rafael, Calif.
[22] Filed: Nov. 25, 1974
[21] Appl. No.: 527,094

[52] U.S. Cl. ............................. 219/68; 219/69 D; 219/69 M
[51] Int. Cl.² ............................................ B23K 9/00
[58] Field of Search ............... 219/68, 69 R, 69 D, 219/69 M

[56] References Cited
UNITED STATES PATENTS

| | | | |
|---|---|---|---|
| 2,974,215 | 3/1961 | Inoue | 219/69 M |
| 3,061,708 | 10/1962 | Pfau | 219/69 D |
| 3,338,808 | 8/1967 | Johnson | 219/68 X |
| 3,409,532 | 11/1968 | Shaw et al. | 219/68 X |

Primary Examiner—J. V. Truhe
Assistant Examiner—David A. Tone
Attorney, Agent, or Firm—Townsend and Townsend

[57] ABSTRACT

Apparatus and a method for cutting a workpiece by a rotary arc saw wherein the residue from the cutting of the workpiece presents atmospheric contamination or the like. The apparatus includes a cutting chamber adapted to contain a fluid coolant which is flowable into and out of the chamber continuously. A rotary arc saw is mounted in the chamber in spaced relationship to a workpiece mount so that, when an arc is established between the arc saw and the workpiece, the workpiece will be progressively cut by the heat of the arc until it is cut to a predetermined depth or is completely severed. An impeller is carried by the arc saw for rotation therewith. The impeller extends below the upper level of the fluid coolant therein and causes circulation of the fluid in the chamber to present a fluid curtain which extends upwardly and across the fluid outlet of the chamber. The residue from the cutting action is caused to circulate in the curtain and to pass out of the chamber to the fluid outlet thereof.

20 Claims, 2 Drawing Figures

ARC SAW COOLING AND DUST COLLECTION SYSTEM

This invention relates to improvements in the cutting of electrically conductive materials with an electric arc and, more particularly, to a rotary arc saw apparatus having means for collecting and confining the residue from an arc sawing operation.

BACKGROUND OF THE INVENTION

To date, many tests have been conducted which prove the feasibility of the use of an arc saw in cutting a variety of electrically conductive materials. Certain of such tests have been conducted in ambient air and with other atmospheres such as an argon atmosphere. Moreover, such tests have been conducted with and without cooling of the arc saw itself.

Under some circumstances, it is desirable to collect the residue resulting from the cutting of a workpiece by a rotary arc saw. The reason for this is to prevent or to minimize atmosphereic contamination and to collect the residue. This is extremely important when the residue may be pyrophoric or imposes other hazards, such as atmospheric contamination.

It is thus desirable to cut such materials under a liquid bath in some circumstances. However, some materials, such as reactive metals, may be difficult to arc saw under such circumstances since the combination of arcing under the surface of a liquid could cause formation of hydrogen when water-based coolants are considered. Thus, a need has arisen for a safer way to perform an arc sawing operation yet to permit the collection of the residue in a manner such that there is substantially no atmospheric or other contamination.

SUMMARY OF THE INVENTION

The present invention is directed to apparatus and a method for satisfying the foregoing need and, to this end, is directed to the use of an impeller with the rotary arc saw of a rotary arc cutting system to create a circulatory flow of a fluid coolant in the cutting chamber during the cutting operation. The circulatory flow causes a water curtain to surround the cutting zone yet the cutting zone is out of the water. Moreover, the curtain eventually receives the residue from the cutting operation and conveys it to a fluid outlet of the chamber whereby flow of the residue from the chamber can be controlled and the residue can be readily collected at a remote location. The cutting of the workpiece by the rotary arc saw can continue until the desired cutting depth has been reached, all of which can continue as the residue is collected and carried off from the chamber by virtue of establishing a continuous fluid coolant flow through the chamber from the inlet thereof to the outlet. While a number of different fluids can be used for this purpose, water is a typical coolant.

In the cutting operation, the residue leaves the blade in a tangential projectory and impinges directly into the water curtain surrounding the cutting zone. Design of the impeller could be such as to limit the quantity of water being pumped by virtue of the diameter, speed of rotation and the capacity of pumping of the impeller itself. If desired, auxiliary cooling of the rotary arc saw could be accomplished by spray or other fluid impingement thereon. However, it is also possible to arrange the geometry of the rotary arc saw and the impeller to enable cooling of the arc saw by centrifugal liquid. Also, the height of the centrifugal water curtain can be controlled by the quantity of fluid in the chamber. By metering the same amount of fluid in and out of the chamber, the residue can be continually removed from the chamber.

The primary object of this invention is to provide a rotary arc saw apparatus and method for cutting a workpiece wherein the cutting action occurs within a chamber having a fluid coolant therein and means is provided for creating and maintaining a fluid curtain surrounding the cutting zone so that residue formed by the cutting of the workpiece will be directed into and be collected by the curtain and carried out of the chamber to the fluid outlet thereof.

Another object of this invention is to provide a system of the type described wherein the cutting zone is above the fluid level in the chamber so that many different types of metals, including reactive metals, can be cut in accordance with the present invention yet the cutting action can be carried out with substantially no atmospheric or other contamination occurring.

Other objects of this invention will become apparent as the following specification progresses, reference being had to the accompanying drawing for an illustration of the invention.

Figure 2:
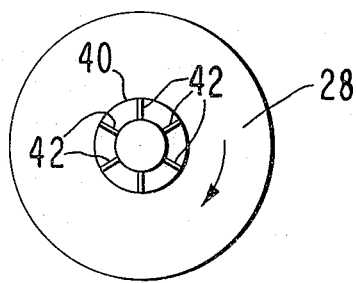

In the drawing:

FIG. 1 is a side elevational view, partly in section, of the apparatus for carrying out the teachings of this invention; and FIG. 2 is a bottom plan view of the rotary arc saw and impeller, looking in the direction of line 2—2 of FIG. 1.

The apparatus of the present invention is broadly denoted by the numeral 10 and includes a vessel 12 defining a chamber 14 for receiving a fluid coolant 16 to a predetermined level 18. The coolant flows into the chamber through an inlet pipe 20 and flows out of the chamber through an outlet pipe 22.

Vessel 12 has a mount 24 for positioning a workpiece 26 to be cut. A rotary arc saw 28 is also provided in chamber 14 above fluid level 18 therein. Arc saw 28 is coupled to a shaft 30 which extends through an opening 32 in the top 34 of vessel 12. Shaft 30 is adapted to be rotated about its longitudinal axis in a direction of arrow 36 and is adapted to be reciprocated in the direction of arrows 38. Thus, the arc saw can rotate about its central axis as it is progressively moved toward workpiece 26 during a cutting operation. As soon as the operation is completed, the arc saw is retracted to its initial position.

A pump or impeller 40 is coupled with arc saw 28 for rotation therewith. Impeller 40 has a plurality of spaced fins 42 which extend below surface 18 and cause a circulatory flow of fluid 16 in vessel 12 as shaft 30 rotates. This circulatory flow creates a water curtain 44 in surrounding relationship to the cutting zone and this water curtain extends about the interior of the upper margin of chamber 14. The water curtain also extends across the outlet opening 46 leading to outlet pipe 22.

In operation, a fluid coolant, such as water, is directed into chamber 14 and the chamber is filled to a depth slightly above level 18. With workpiece 26 mounted in the chamber and with arc saw 28 rotating, the arc saw is shifted into a location adjacent to but spaced from the workpiece. Then, an arc is established between the workpiece and the arc saw and the heat of the arc commences to cut the workpiece. The cutting proceeds until a predetermined depth of cut has been reached or until the workpiece is severed into two parts.

As the cutting continues and as the arc saw rotates, impeller 40 causes the aforesaid circulatory motion and continuously maintains curtain 44 in chamber 14. The residue from the cutting action leaves blade 28 tangentially thereof and penetrates the water curtain and the water curtain retains the residue in a suspended condition. Eventually, the residue flows in the water curtain to outlet 46 and leaves chamber 14 through pipe 22. The residue can then be collected at any suitable location.

While the impeller has been shown as being coupled to the arc saw, this is not necessary so long as the water curtain is formed. Furthermore, shaft 30 need not be vertical. It may be inclined or may be horizontal if desired. In any case, the residue will leave the arc saw tangentially thereof and be directed into the water curtain.

I claim:

1. An arc saw cutting apparatus comprising: means defining a chamber having an upright wall, an inlet and an outlet for the chamber for permitting a fluid flow through the chamber and to allow the fluid to reach a predetermined level in the chamber; means in the chamber for mounting a workpiece to be cut; an arc saw; means mounting the arc saw for rotation and for movement toward the workpiece when the latter is mounted in the chamber whereby an arc established between the workpiece and the arc saw will cause the workpiece to be cut; and means in said chamber for imparting to the fluid in the chamber a circulatory flow so that the fluid rises along the chamber wall above the predetermined level and above the arc saw into fluid communication with said outlet to thereby form a fluid curtain surrounding the arc saw.

2. Apparatus as set forth in claim 1, wherein said forming and maintaining means comprises a pump.

3. Apparatus as set forth in claim 1, wherein said forming and maintaining means includes an impeller coupled to and rotatable with said arc saw.

4. Apparatus as set forth in claim 1, wherein said defining means includes a vessel having a top connected with the walls, said fluid curtain being confined by said top.

5. Apparatus as set forth in claim 1, wherein said arc saw mounting means includes a shaft extending through said chamber defining means.

6. Apparatus as set forth in claim 1, wherein said arc saw mounting means is operable to position said arc saw at a location above said fluid level.

7. A method of cutting an electrically conductive workpiece with a rotary arc saw comprising: establishing an electric arc between the workpiece and the arc saw, whereby the residue from the cutting of the workpiece will be directed tangentially of and away from the arc saw; directing a fluid body into a region below said arc saw, creating a circulatory flow in the fluid body about an upright axis so that the upper part of said flow defines a fluid curtain surrounding the saw; collecting the residue in said fluid curtain; and directing at least a portion of the fluid curtain along a path away from the arc saw to carry the residue to a remote location.

8. A method as set forth in claim 7, wherein is included the step of forming said fluid curtain as a function of the rotation of said arc saw.

9. A method as set forth in claim 7, wherein is included the step of placing the workpiece and the arc saw in a chamber, partially filling the chamber with a fluid coolant to a level below said arc saw, and imparting a circulatory flow of sufficient magnitude to said fluid in the chamber to raise a portion of the fluid along a chamber wall above the arc saw to thereby present said fluid curtain.

10. An arc saw cutting apparatus comprising a chamber having upright walls, a top, and a bottom; means for mounting a workpiece within the chamber; an arc saw positioned to draw an arc between the workpiece and the saw when an electric potential is applied to them; means mounting the arc saw for rotation about a generally upright axis at a point spaced from the top and the bottom; means for imparting to a fluid in the chamber a rotary motion about a generally vertical axis of a sufficient magnitude so that the fluid level is below the arc saw and a portion of the fluid forms a generally upright fluid curtain extending above the arc saw; whereby particles thrown off the arc saw in a generally tangential direction are collected by the fluid curtain and become suspended in the fluid.

11. Apparatus according to claim 10 wherein the fluid rotating means comprises an impeller at least partially submerged in the fluid at all times, and means for rotating the impeller about a generally upright axis.

12. Apparatus according to claim 11 wherein the impeller rotating means comprises means connecting the impeller to the arc saw rotating means.

13. Apparatus according to claim 10 including means for withdrawing fluid from the chamber to thereby transport the suspended particles to a remote location.

14. Apparatus according to claim 13 including means for replacing the amount of fluid withdrawn from the chamber.

15. Apparatus according to claim 10 wherein the arc saw rotating means rotates the arc saw about a vertical axis.

16. An arc saw method comprising the steps of: providing a vessel having upright walls and defining a chamber; positioning a workpiece in the chamber and positioning an arc saw opposite the workpiece; drawing an arc between the saw and the workpiece; rotating the arc saw about a generally upright axis; partially filling the chamber with a liquid; rotating the liquid about an upright axis to impart thereto a circulatory flow causing the formation of a generally upright liquid curtain extending vertically above the plane of rotation of the arc saw; and collecting particles tangentially thrown off the arc saw in the liquid curtain.

17. A method according to claim 16 wherein an impeller extending into the flluid is connected with the arc saw so that rotation of the arc saw causes a like rotation of the impeller which imparts the circulatory flow to the liquid.

18. A method according to claim 17 including the step of filling the chamber with sufficient liquid so that the impeller is at all times at least partially submerged in the liquid.

19. A method according to claim 18 including the step of transporting the suspended particles to a remote location by withdrawing from the formed liquid curtain liquid including suspended particles, and replacing the withdrawn liquid at a point below the curtain.

20. A method according to claim 16 wherein the step of partially filling comprises the step of filling the chamber with a quantity of liquid so that the portion of the arc saw at which the arc is drawn is outside the liquid.

* * * * *